United States Patent
Park

(10) Patent No.: US 9,843,988 B2
(45) Date of Patent: Dec. 12, 2017

(54) MODIFIED ACCESS CLASSES FOR MACHINE TYPE COMMUNICATION (MTC) DEVICES DURING EMERGENCIES

(71) Applicant: Sharp Kabushiki Kaisha, Osaka-shi, Osaka (JP)

(72) Inventor: Kenneth James Park, Cathlamet, WA (US)

(73) Assignee: Sharp Kabushiki Kaisha, Sakai (JP)

( * ) Notice: Subject to any disclaimer, the term of this patent is extended or adjusted under 35 U.S.C. 154(b) by 355 days.

(21) Appl. No.: 14/496,244

(22) Filed: Sep. 25, 2014

(65) Prior Publication Data

US 2015/0049609 A1 Feb. 19, 2015

Related U.S. Application Data

(63) Continuation of application No. 12/772,125, filed on Apr. 30, 2010, now Pat. No. 8,868,743.

(51) Int. Cl.
| | |
|---|---|
| *H04W 48/06* | (2009.01) |
| *H04W 4/00* | (2009.01) |
| *H04W 4/22* | (2009.01) |
| *H04W 68/00* | (2009.01) |
| *H04W 48/08* | (2009.01) |
| *H04W 74/00* | (2009.01) |
| *H04W 76/00* | (2009.01) |

(52) U.S. Cl.
CPC .......... *H04W 48/06* (2013.01); *H04W 4/00* (2013.01); *H04W 4/005* (2013.01); *H04W 4/22* (2013.01); *H04W 68/00* (2013.01); *H04W 48/08* (2013.01); *H04W 74/00* (2013.01); *H04W 76/007* (2013.01)

(58) Field of Classification Search
CPC ....... H04W 48/06; H04W 68/00; H04W 4/00; H04W 48/08; H04W 4/005
See application file for complete search history.

(56) References Cited

U.S. PATENT DOCUMENTS 6,381,241 B1 * 4/2002 Ghirnikar ............. H04L 1/1809
340/7.2
2005/0277429 A1 * 12/2005 Laroia ................. H04W 68/025
455/458

OTHER PUBLICATIONS

Park, "Modified Access Classes for Machine Type Communication (MTC) Devices During Emergencies", U.S. Appl. No. 12/772,125, filed Apr. 30, 2010.
3GPP TS 22.368 V1.2.2, 3rd Generation Partnership Project; Technical Specification Group Services and System Aspects; Service Requirements for Machine-Type Communications; Stage 1 (Release 10), Feb. 2010, pp. 1-23.

* cited by examiner

*Primary Examiner* — Anez Ebrahim
(74) *Attorney, Agent, or Firm* — Keating & Bennett, LLP

(57) ABSTRACT

A method for determining whether to attempt to attach to a network by a machine type communication (MTC) device is described. A triggering event is detected. A radio frame is received from a base station. The radio frame includes a current access class of the base station. The radio frame is the first radio frame to include the current access class after the triggering event. It is determined if the MTC device has access privileges to the base station. It is then decided whether to attempt to attach to a network based on if the MTC device has access privileges.

8 Claims, 11 Drawing Sheets

US 9,843,988 B2

MODIFIED ACCESS CLASSES FOR MACHINE TYPE COMMUNICATION (MTC) DEVICES DURING EMERGENCIES

TECHNICAL FIELD

The present invention relates generally to wireless communications and wireless communications-related technology. More specifically, the present invention relates to modified access classes for machine type communication (MTC) devices during emergencies.

BACKGROUND

Wireless communication devices have become smaller and more powerful in order to meet consumer needs and to improve portability and convenience. Consumers have become dependent upon wireless communication devices and have come to expect reliable service, expanded areas of coverage, and increased functionality. A wireless communication system may provide communication for a number of cells, each of which may be serviced by a base station. A base station may be a fixed station that communicates with mobile stations.

As wireless communication devices have become more advanced, the potential uses of wireless communication devices have also increased. One such advancement is the introduction of machine-to-machine (M2M) devices. These devices may provide little or no human interface while facilitating the communication between multiple wireless devices.

Because these devices do not merely provide an interface for human interaction, many more of these devices may rely on a single base station. With an increase in the number of wireless devices communicating with a base station, there is potential for the base station to be overloaded. Benefits may be realized by preventing the base station from becoming overloaded.

DETAILED DESCRIPTION

Figure 1:
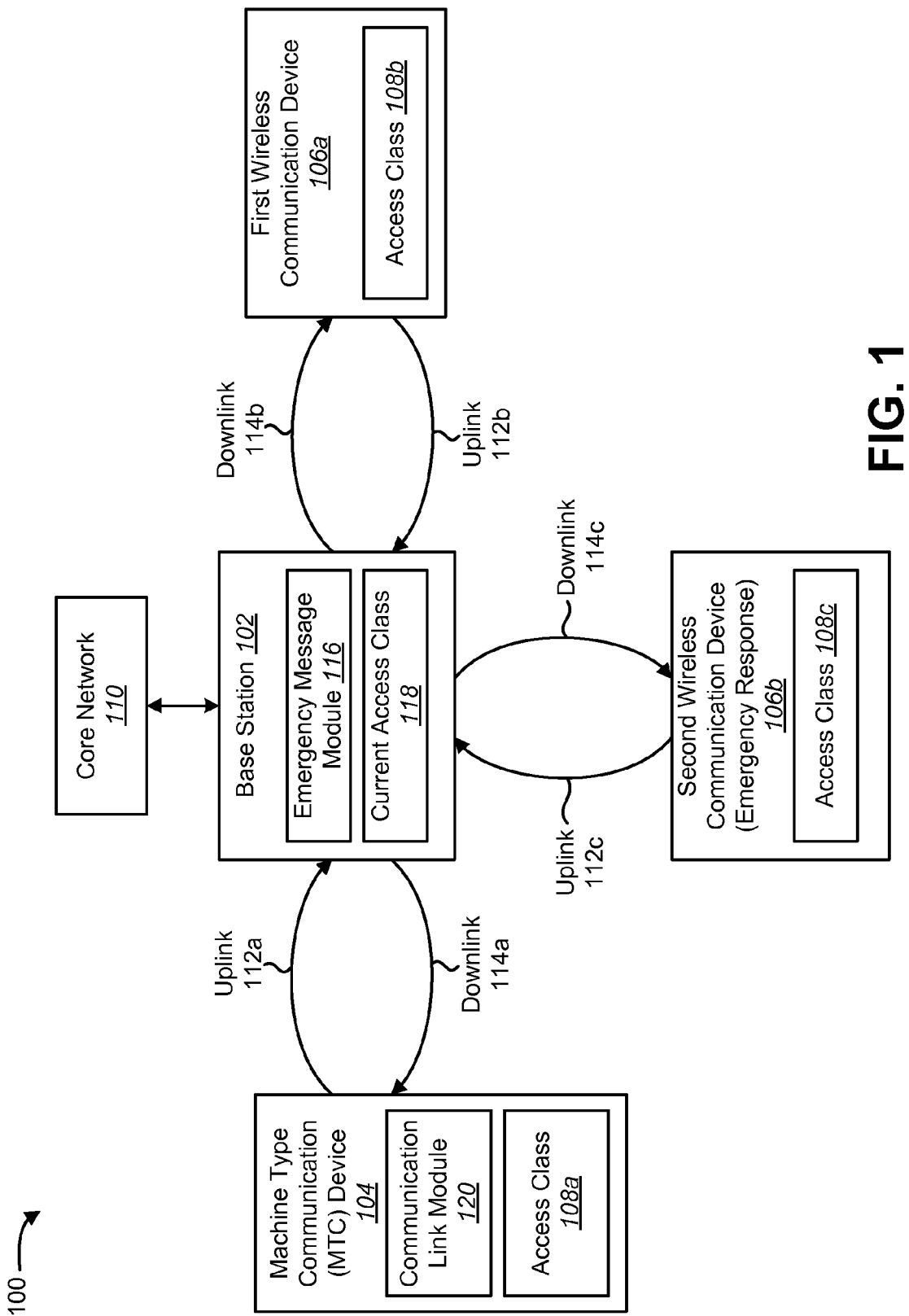
FIG. 1 is a block diagram illustrating a wireless communication system with multiple wireless devices and a core network.

A method for determining whether to attempt to attach to a network by a machine type communication (MTC) device is described. A triggering event is detected. A radio frame from a base station is received. The radio frame includes a current access class of the base station. The radio frame is the first radio frame including the current access class after the triggering event. The method includes determining if the MTC device has access privileges to the base station. The method also includes deciding whether to attempt to attach to a network based on if the MTC device has access privileges.

The method may further include determining the current access class of the base station from the radio frame. Determining if the MTC device has access privileges to the base station may include comparing an access class of the MTC device with the current access class of the base station. An MTC device has access privileges to the base station if the access class of the MTC device is greater than the current access class of the base station. The current access class may be in a type 2 system information block (SIB2).

The attempt to attach to the network may be abandoned if the MTC device does not have access privileges. The method may also include attempting to attach to the network if the MTC device does have access privileges. A distribution of physical random access channel (PRACH) opportunities to use to attempt to attach to the network may be determined. One or more PRACH opportunities may be selected from the distribution of PRACH opportunities. Attempting to attach to the network may include attempting to attach to the network using the selected one or more PRACH opportunities.

Determining a distribution of PRACH opportunities may include using a random number generator along with a range value indicating a first and last PRACH opportunity that may be used. Determining a distribution of PRACH opportunities may also include taking as input a delta-time from when the triggering event was received and when the radio frame was received. Determining a distribution of PRACH opportunities may further include using a registration number for the MTC device and a range value indicating the possible PRACH opportunities and mapping the registration number across the range value.

The current access class of the base station may be in a data element ac-BarringInfo of a SystemInformationBlock-Type2 message. The data element ac-BarringInfo may be examined to determine the current access class of the base station. The triggering event may require the MTC device to attempt to attach to the network.

An apparatus configured for determining whether to attempt to attach to a network is also described. The apparatus includes a processor, memory in electronic communication with the processor and instructions stored in the memory. The instructions are executable to detect a triggering event. The instructions are also executable to receive a radio frame from a base station. The radio frame includes a current access class of the base station. The radio frame is the first radio frame to include the current access class after the triggering event. The instructions are further executable to determine if the apparatus has access privileges to the base station. The instructions are also executable to decide whether to attempt to attach to a network based on if the apparatus has access privileges. The apparatus may be a machine type communication (MTC) device.

A method for handling emergency events by a base station is also described. An emergency message is received. Scheduling information and message data are changed. A current access class is updated. A system information message with the scheduling information and the current access class is broadcast.

A paging message may be sent to wireless devices indicating the emergency message and a change in scheduling data. The scheduling information may be broadcast in an SIB1 subframe. The current access class may be broadcast in an SIB2 subframe. The system information message may be broadcast to one or more machine type communication (MTC) devices.

An apparatus configured for handling emergency events is described. The apparatus includes a processor, memory in electronic communication with the processor and instructions stored in the memory. The instructions are executable to receive an emergency message. The instructions are also executable to change scheduling information and message data. The instructions are further executable to update a current access class. The instructions are also executable to broadcast a system information message with the scheduling information and the current access class.

FIG. 1 is a block diagram illustrating a wireless communication system 100 with multiple wireless devices and a core network 110. A wireless device may be a wireless communication device 106, a base station 102 or a machine type communication (MTC) device 104. A base station 102 may be in wireless communication with one or more wireless communication devices 106 and one or more machine type communication (MTC) devices 104. A base station 102 may be referred to as an access point, a Node B, an eNodeB, or some other terminology. Likewise, a wireless communication device 106 may be referred to as a mobile station, a subscriber station, an access terminal, a remote station, a user terminal, a terminal, a handset, a subscriber unit, user equipment, or some other terminology.

A wireless communication device 106 may be a cellular phone, a smart phone, a laptop, a personal digital assistant (PDA), a wireless modem, etc. The wireless communication device 106 may transmit data to the base station 102 over a radio frequency (RF) communication channel. Likewise, the base station 102 may transmit data to the wireless communication device 106 over a radio frequency (RF) communication channel.

A wireless device such as a wireless communication device 106 or a machine type communication (MTC) device 104 may communicate with zero, one or multiple base stations 102 on the downlink 114a-c and/or uplink 112a-c at any given moment. The downlink 114 refers to the communication link from a base station 102 to a wireless device such as a wireless communication device 106 or a machine type communication (MTC) device 104. The uplink 112 refers to the communication link from a wireless device such as a wireless communication device 106 and a machine type communication (MTC) device 104 to a base station 102. The communication link may be established using a single-input and single-output (SISO), multiple-input and single-output (MISO) or a multiple-input and multiple-output (MIMO) system. A MIMO system may include both a transmitter and a receiver equipped with multiple transmit and receive antennas.

The Third Generation Partnership Project (3GPP) is a collaboration between groups of telecommunications associations to make globally applicable mobile phone system specifications. Long Term Evolution (LTE) is the project name of a high performance air interface for cellular mobile telephony. Long Term Advanced (LTE-A) is a mobile communication standard that works as an enhancement to the LTE air interface. In 3GPP LTE-A Release 10, specifications include functionality that enables the use of machine type communication (MTC) devices 104.

A machine type communication (MTC) device 104 is similar to a wireless communication device 106, except the primary function does not provide a user interface. A machine type communication (MTC) device 104 may use the physical (PHY) layer, medium access control (MAC) layer, radio link control (RLC) layer, the Packet Data Convergence Protocol (PDCP) and the Radio Resource Control (RRC) layer to establish a communication link with a base station 102 and the core network 110. However, a machine type communication (MTC) device 104 may not provide a human interface. Instead, a machine type communication (MTC) device 104 may operate as a network access point between machines (i.e., between data acquisition and data aggregation devices). Examples of machine type communication (MTC) devices 104 include surveillance equipment, utility measurement devices, fleet management devices and production chain monitoring devices.

A base station 102 may be configured to establish communication links with multiple wireless communication devices 106a-b and/or multiple machine type communication (MTC) devices 104. Because of the limited communication requirements for machine type communication (MTC) devices 104, many more machine type communication (MTC) devices 104 may be influenced by a base station 102 than wireless communication devices 106 influenced by the base station 102. It is predicted that ten times as many machine type communication (MTC) devices 104 as wireless communication devices 106 may be under the influence of a base station 102.

In LTE-A, emergency features such as the Earthquake and Tsunami Warning System (ETWS) and the Commercial Mobile Alert System (CMAS) may be used. These emergency features may not be applicable to machine type communication (MTC) devices 104 because the information broadcast in response to such events may be intended for human consumption. When an ETWS or CMAS event occurs, it may be desirable that all non-essential traffic be removed from the network, so that security, health and emergency services are provided any and all necessary bandwidth. The base station 102 may include an emergency message module 116. The base station 102 may use the emergency message module 116 to ensure that bandwidth is properly allocated during an emergency situation.

One way for the base station 102 to allocate bandwidth during an emergency situation is the use of access classes. Each wireless communication device 106a-b may be preconfigured with one or more access classes 108b-c. Each machine type communication (MTC) device 104 may also be preconfigured with one or more access classes 108a. An access class 108 may be a value from 1 to n. Before a wireless communication device 106 or a machine type communication (MTC) device 104 can access the network (i.e., access the core network 110 via the base station 102), the wireless communication device 106 or machine type communication (MTC) device 104 may be required to verify that at least one of the access classes 108 meets or exceeds a current access class 118 on the base station 102. A wireless communication device 106 or machine type communication (MTC) device 104 may retrieve the current access class 118 value from the base station 102 in a System Information (SI) message. System Information (SI) messages are discussed in further detail below in relation to FIG. 3.

Each wireless device communication device 106 and machine type communication (MTC) device 104 may compare the one or more access classes 108 with the retrieved current access class 118. If the access class 108 of a wireless communication device 106 or a machine type communication (MTC) device 104 is greater than the current access class 118, the wireless communication device 106 or machine type communication (MTC) device 104 may determine that access of the base station 102 is appropriate (i.e., that access privileges are granted for the base station 102).

For example, if the access class 108b of the first wireless communication device 106a is 3 and the current access class 118 of the base station is 4, the first wireless communication device 106a may not attempt to access the base station 102. Thus, the first wireless communication device 106a may not be an emergency response wireless communication device 106. If the access class 108c of the second wireless communication device 106b is 5 (a higher number because the second wireless communication device 106b is an emergency response wireless communication device 106) and the current access class 118 of the base station is 4, the second wireless communication device 106b may be able to access the base station 102 even though the first wireless communication device 106a is not able to access the base station 102. If the access class 108a of the machine type communication (MTC) device 104 is 1 and the current access class 118 of the base station 102 is 4, the machine type communication (MTC) device 104 may refrain from attempting to access the base station 102.

A machine type communication (MTC) device 104 may include a communication link module 120. The communication link module 120 may obtain the current access class 118 from the base station 102 and then compare the access class 108a of the machine type communication (MTC) device 104 with the current access class 118 to determine if access to the base station 102 is appropriate.

Figure 2:
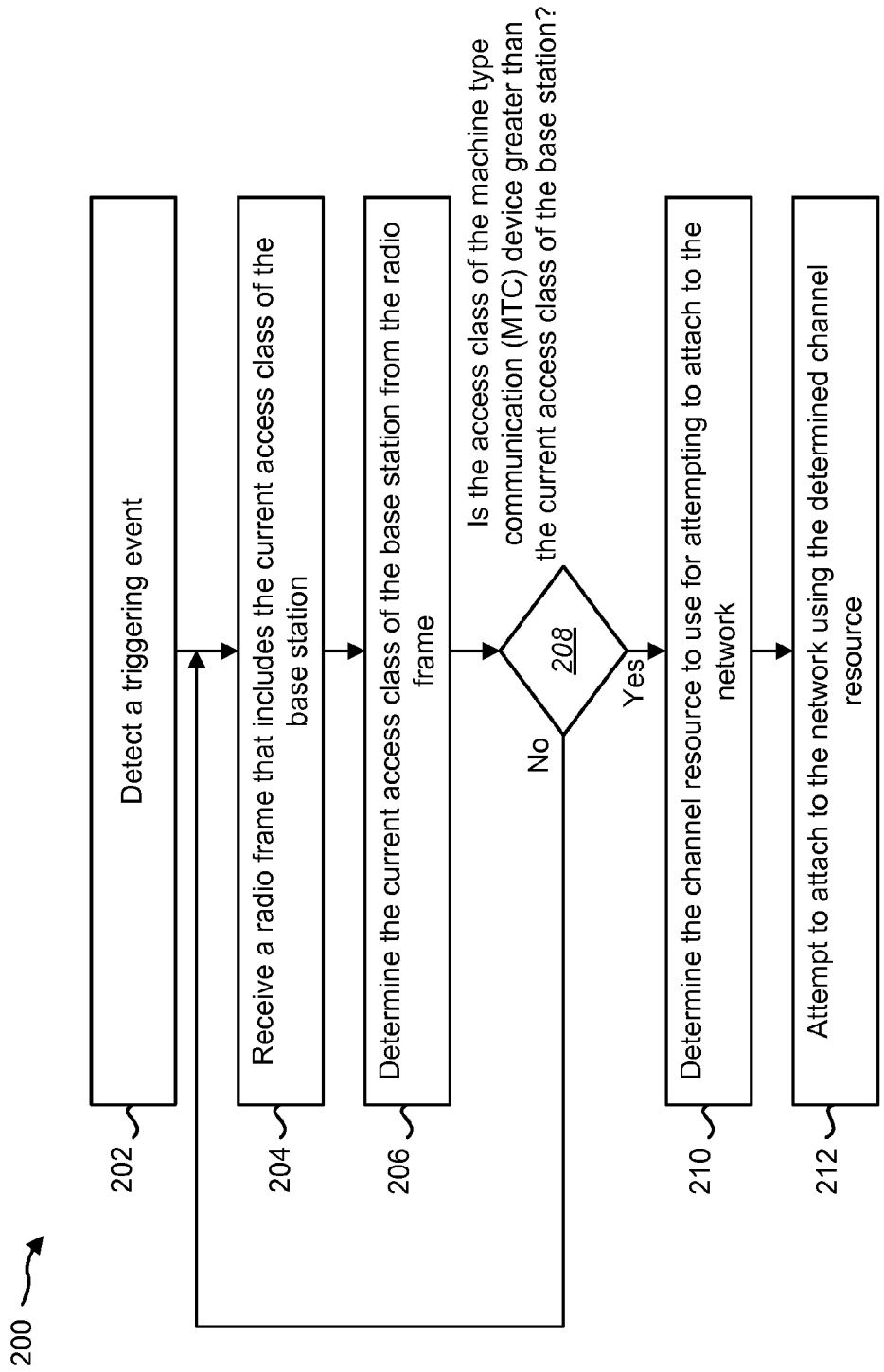
FIG. 2 is a flow diagram of a method for determining whether to attempt to attach to a network.

FIG. 2 is a flow diagram of a method 200 for determining whether to attempt to attach to a network. The method 200 may be performed by a machine type communication (MTC) device 104. The machine type communication (MTC) device 104 may detect 202 a triggering event. A triggering event may be any event that triggers the machine type communication (MTC) device 104 to attempt to attach to the network. Triggering events may include a change in pressure on an oil valve, a sudden drop in temperature, a change in heart rhythms for a pacemaker, etc. Triggering events may be different for each type of machine type communication (MTC) device 104.

Upon detecting 202 a triggering event, the machine type communication (MTC) device 104 may receive 204 a radio frame that includes the current access class 118 of the base station 102. The base station 102 may periodically broadcast radio frames that include the current access class 118. For example, in one configuration, the base station 102 may broadcast a radio frame that includes the current access class 118 every eighth radio frame. The distribution of the SIB2 subframe that carried the current access class 118 may be configurable by the system but the range of configurability does not include a periodic of every radio frame. Upon receiving 204 a radio frame that includes the current access class 118, the machine type communication (MTC) device 104 may determine 206 the current access class 118 of the base station 102 from the radio frame.

In Release-10, a wireless device (such as a machine type communication (MTC) device 104) is not required to determine 206 the current access class 118 of the base station 102 if the wireless device has recently received the current access class 118 from the base station 102. However, this creates a window where a base station is handling an emergency situation but has not updated the current access class 118 (this updating normally takes place at the end of a Modification Period) and a wireless device attempts to access the network without sufficient access privileges. To remedy this, the base station 102 may update the current access class 118 at any time within a Modification Period. A wireless device is also required to determine 206 the current access class 118 of the base station 102 after every triggering event. This is discussed in further detail below in relation to FIG. 3.

The machine type communication (MTC) device 104 may then determine 208 whether the access class 108a of the machine type communication (MTC) device 104 is greater than the current access class 118 of the base station 102. If the access class 108a of the machine type communication (MTC) device 104 is not greater than the current access class 118 of the base station 102, the machine type communication (MTC) device 104 may wait until the base station 102 broadcasts another radio frame that includes the current access class 118. Thus, the machine type communication (MTC) device 104 will not attempt to attach to the network.

If the access class 108a of the machine type communication (MTC) device 104 is greater than the current access class 118 of the base station 102, the machine type communication (MTC) device 104 may determine 210 the channel resource to use for attempting to attach to the network. The channel resource may be a physical random access channel (PRACH). The machine type communication (MTC) device 104 may then attempt 212 to attach to the network using the determined channel resource.

Figure 3:
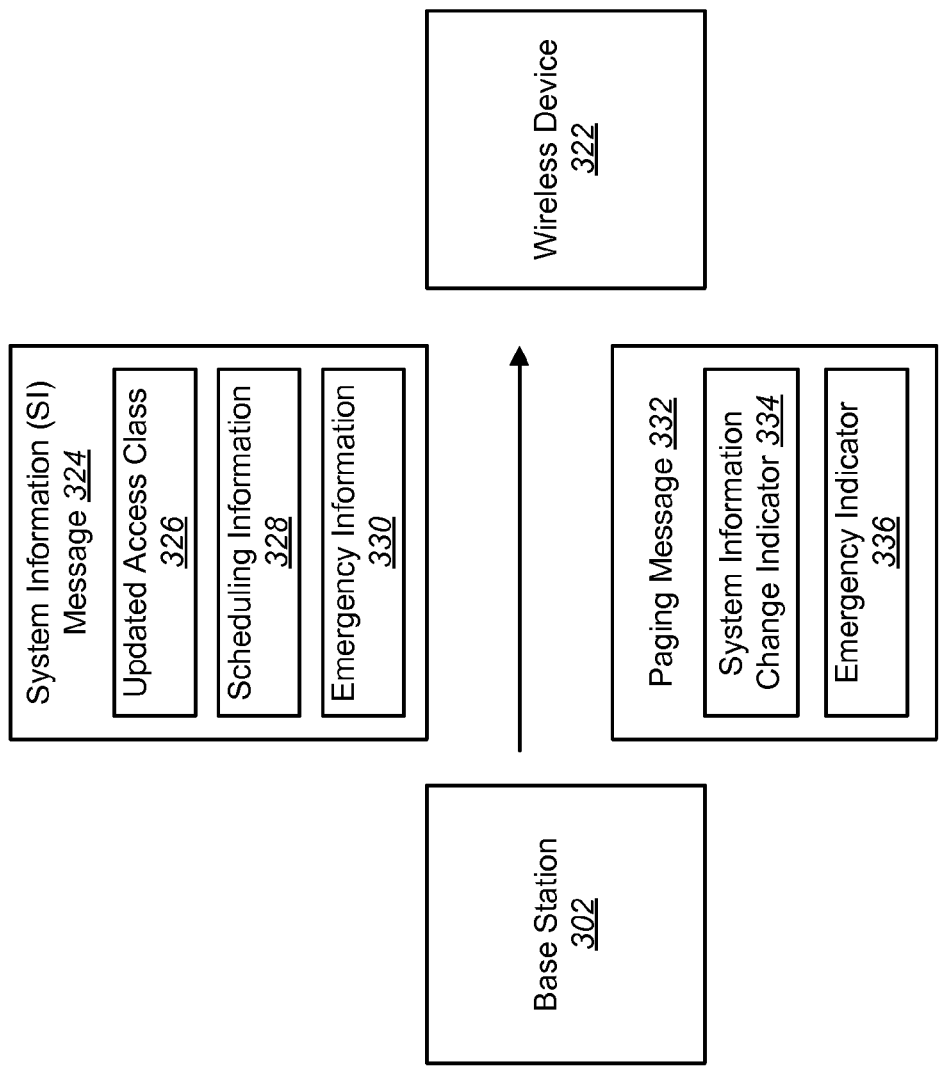
FIG. 3 is a block diagram illustrating the transmission of a System Information (SI) message and a paging message to a wireless device.

FIG. 3 is a block diagram illustrating the transmission of a System Information (SI) message 324 and a paging message 332 to a wireless device 322. The base station 302 of FIG. 3 may be one configuration of the base station 102 of FIG. 1. The wireless device 322 of FIG. 3 may be one configuration of the machine type communication (MTC) device 104 or wireless communication device 106 of FIG. 1. The base station 302 may broadcast a downlink radio frame that includes the system information message 324. The downlink radio frame may be broadcast to machine type communication (MTC) devices 104 and wireless communication devices 106.

In LTE-A, the base station 302 broadcasts information necessary for a wireless communication device 106 or a machine type communication (MTC) device 104 to establish a communication link with the network via System Information (SI) messages 324. System information is divided into the master information block (MIB) and a number of system information blocks (e.g., SIB1 . . . SIB12). A first system information block may be referred to as SystemInformationBlockType1 (SIB1) and may include scheduling information 328 in SchedulingInfoList that indicates where emergency information 330 such as ETWS/CMAS SIB messages are located. and a system information change indicator systemInfoValueTag that indicates a change in the System Information (SI) message 324 has occurred.

A second system information block may be referred to as SystemInformationBlockType2 (SIB2) and may include a hierarchical partitioning of wireless communication devices 106 and machine type communication (MTC) devices 104 in ac-BarringInfo. The second system information block may thus include an updated access class 326 (i.e., the current access class 118 of the base station 102). The current Release-10 specification precludes the change of SIB2 data except upon a specific radio frame at a Modification Period boundary. Thus, the base station 302 can only change the updated access class 326 at the Modification Period boundary. A Modification Period boundary may be every 32 radio frames.

The current Release-10 specification also does not require a wireless device 322 to check the state of the SIB2 subframe (i.e., the updated access class 326) prior to attempting to attach to the network if the wireless device 322 has recently received SIB2 data. It is therefore possible that a window exists where a wireless device 322 may attempt to attach to the network while the network is responding to an emergency event (i.e., broadcasting Earthquake and Tsunami Warning System (ETWS)/Commercial Mobile Alert System (CMAS) data). In the current specification, this window was not considered a significant problem because the maximum number of wireless communication devices 106 under the influence of a base station 302 was considered manageable relative to the physical random access channel (PRACH) resources available to service them. But with the inclusion of machine type communication (MTC) devices 104, a base station 302 may support many more wireless devices 322 (a base station 302 may support approximately ten times as many machine type communication (MTC) devices 104 as wireless communication devices 106) and the potential to overburden the physical random access channel (PRACH) resources of the base station 302 exists.

Another system information block may be referred to as SystemInformationBlockType10/11 (SIB10 and SIB11) and may include the Earthquake and Tsunami Warning System (ETWS) message data. Yet another system information block may be referred to as SystemInformationBlockType12 and may include the Commercial Mobile Alert System (CMAS) message data. SystemInformationBLockType10/11 and SystemInformationBlockType12 may each include emergency information 330.

A base station 302 may broadcast a paging message 332 to inform a wireless device 322 such as a wireless communication device 106 or a machine type communication (MTC) device 104 of a system information change. A paging message 332 may be broadcast periodically at the wireless communication device's 106 or machine type communication (MTC) device's 104 paging occasion. The paging occasion may be determined by the International Mobile Equipment Identity (IMEI) of a wireless communication device 106 or machine type communication (MTC) device 104 and system configuration settings.

The paging message 332 may include a system information change indicator 334 and an emergency indicator 336. The system information change indicator 334 may be the data field systemInfoModification, which when set indicates that System Information (SI) data is scheduled to change at the next Modification Period boundary. A Modification Period boundary limits when changes to the updated access class 326 in SIB2 data are allowed. Change of SIB2 data only occurs at specific radio frames. SIB2 data may be transmitted a number of times with the same content within a modification period, as defined by its scheduling. When systemInfoModification is set during "modification period N" then the change will not occur until "modification period N+1." The emergency indicator 336 may be the data field etws/cmas-Indication, which, when set, indicates that emergency information 330 (such as ETWS/CMAS information) is being broadcast.

An emergency message (i.e., emergency information 330) such as ETWS/CMAS messages can occur at any point in time. In other words, the scheduling information 328 in SIB1 and the emergency information 330 in SIB10/11/12 are not required to transition on a modification period boundary (unlike all other SIB data). The paging message 332 may be used to inform a wireless communication device 106 about the presence of emergency information 330 in SIB10/11/12 and the associated scheduling information 328 in SIB1. When a wireless communication device 106 receives a paging message 332 that includes the emergency indicator 336 ewts/cmas-Indication, the wireless communication device 106 will attempt to receive the next scheduling information 328 in SIB1. The wireless communication device 106 will not wait for the first scheduling information 328 in SIB1 at the start of the next modification period boundary. The next scheduling information 328 in SIB1 may be used to obtain new scheduling information 328 for SIB10/11/12. The wireless communication device may then use the scheduling information 328 to receive the emergency information 330 such as the ETWS/CMAS message carried by SIB10/11/12.

Figure 4:
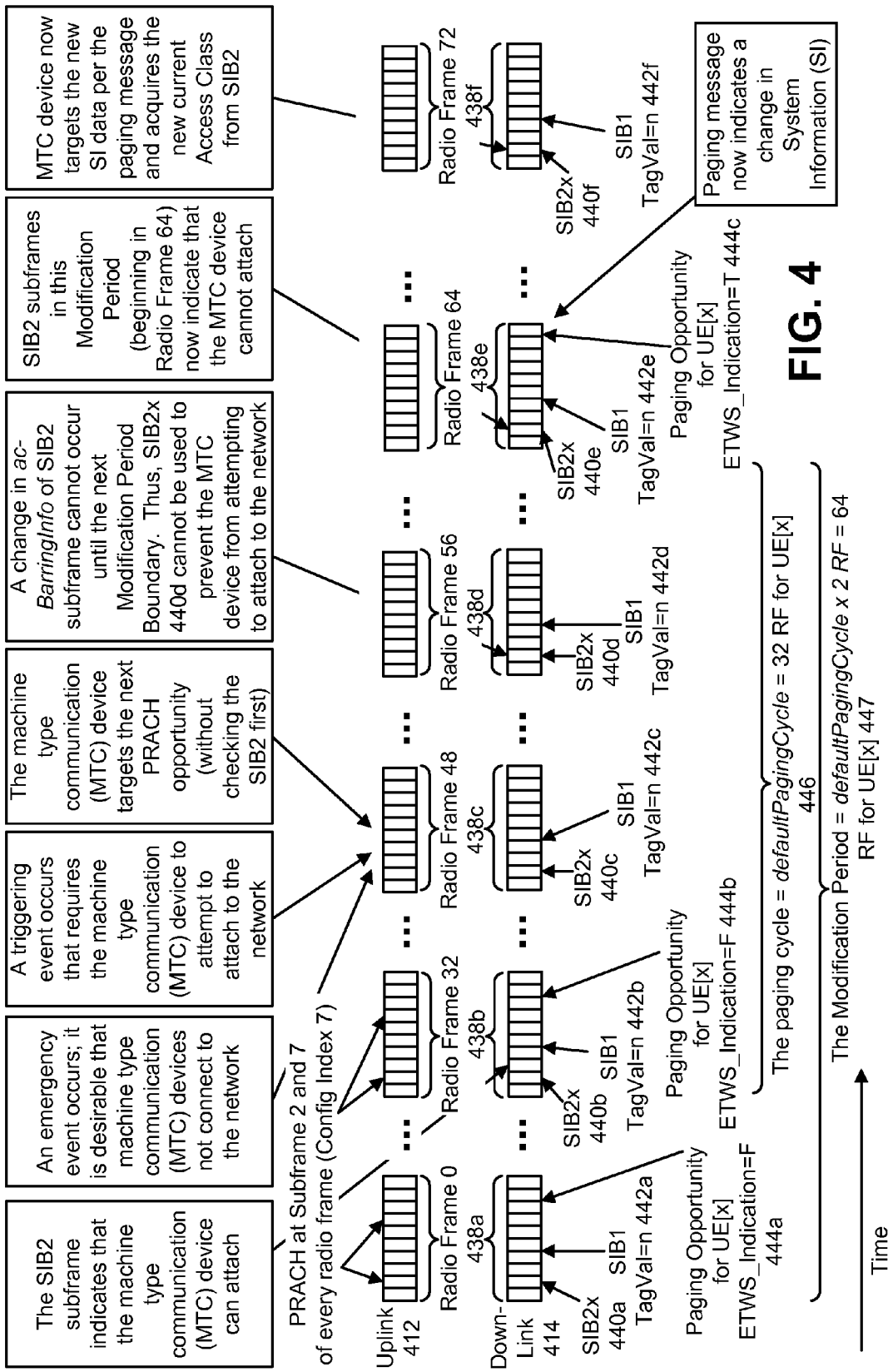
FIG. 4 illustrates uplink and downlink radio frames between a base station and a machine type communication (MTC) device.

FIG. 4 illustrates uplink and downlink radio frames between a base station 102 and a machine type communication (MTC) device 104. In every radio frame 438a-f, the uplink 412 includes a physical random access channel (PRACH) at subframe 2 and subframe 7 with a configuration index of 7. In Radio Frame 0 438a, the downlink 414 includes an SIB2 subframe 440a indicating that a machine type communication (MTC) device 104 can attach to the network by including the current access class 118 of the base station 102. The SIB1 subframe 442a-f may have a TagVal=n for each radio frame 438a-e shown.

The Master Information Block (MIB) schedule may include a periodicity of 40 milliseconds (ms), a first transmission in subframe 0, a first transmission in radio frame (SFN mod 4)=0, and repetitions in 40 ms, one per subframe. The System Information Block (SIB) schedule may include a periodicity of 80 ms, a first transmission in subframe 5, a first transmission in radio frame (SFN mod 8)=0, and repetitions every 80 ms, one every even subframe. The SIB2 subframe 440a-f may have a periodicity of 8 radio frames 438. The System Information (SI) modification period may be equal to 64 radio frames. The default paging cycle 446 may have a periodicity of 320 ms and a transmission in subframe 9.

A Modification Period 447 may be defined as the defaultPagingCycle×2 RF=64 RF. The Modification Period 447 may have a periodicity of 640 ms, a first transmission in subframe 5 and a first transmission in radio frame (SFN mod 64)=0. A paging opportunity 444a-c may be included in Radio Frame 0 438a, Radio Frame 32 438b and Radio Frame 64 438e. A paging opportunity 444a-c may also be referred to as paging occasions. A paging occasion is like an address indicating where a wireless device 322 can receive paging messages 332. The paging occasions are distributed across the radio frames 438 so that different wireless devices 322 will wake up for their pages at different times.

The paging cycle 446 may be defined as the defaultPagingCycle=32 RF. The paging cycle 446 may thus be 32 radio frames. Radio Frame 32 438b may include the same information (or similar information) as Radio Frame 0 such as the SIB2 subframe 440*b* indicating the current access class 118 of the base station 102. In one configuration, an emergency event occurs during Radio Frame 48 438*c*. Once the emergency event has occurred, it may be desirable that the machine type communication (MTC) device 104 does not connect to the network. In this same configuration, a triggering event may occur during Radio Frame 48 438*c* that requires the machine type communication (MTC) device 104 to attempt to attach to the network. The triggering event for the machine type communication (MTC) device 104 does not have to occur in the same radio frame 438 as the emergency event.

Once a machine type communication (MTC) device 104 detects a triggering event, the machine type communication (MTC) device 104 may determine that it should exit IDLE mode and attempt to attach to the network. The machine type communication (MTC) device 104 may have recently targeted the SIB2 subframe 440 in a radio frame 438 (such as in Radio Frame 48 438*c*) that indicated the machine type communication (MTC) device 104 has access privileges to attempt to attach to the network. The machine type communication (MTC) device 104 may target the next physical random access channel (PRACH) opportunity (without checking the SIB2 subframe 440 first).

A change in ac-BarringInfo (i.e., the current access class 118 of the base station 102) of the SIB2 subframe 440 cannot occur until the next Modification Period Boundary (i.e., the beginning of the next Modification Period 447 (Radio Frame 64 438*e* in this case)). Thus, the SIB2 subframe 440*d* of Radio Frame 56 438*d* cannot be used to prevent the machine type communication (MTC) device 104 from attempting to attach to the network. Instead, the base station 102 must wait until Radio Frame 64 438*e* to change the SIB2 subframe 440*e* to indicate that the machine type communication (MTC) device cannot attach to the network. In Radio Frame 64 438*e*, the paging message 332 (via the Paging opportunity 444*c* ETWS_Indication=T) now indicates a change in System Information (SI) via the system information change indicator 334.

In Radio Frame 72 438*f*, the machine type communication (MTC) device 104 may target the new System Information (SI) per the paging message 332. The machine type communication (MTC) device 104 may acquire the new current access class 118 of the base station 102 from the SIB2 subframe 440*f*. The machine type communication (MTC) device 104 may then compare the access class 108*a* of the machine type communication (MTC) device 104 with the current access class 118 to determine whether the machine type communication (MTC) device 104 has access privileges.

The machine type communication (MTC) device 104 may use numerous physical random access channel (PRACH) opportunities in an attempt to establish a connection with the network. Each use of the physical random access channel (PRACH) may cause system congestion. Once the machine type communication (MTC) device 104 has received the updated access class 118 in the paging opportunity 444*c* of subframe SIB2 440*e* of Radio Frame 64 438*e*, the machine type communication (MTC) device 104 may determine that the emergency event has occurred and that there is a change in System Information (SI) data. If the machine type communication (MTC) device 104 determines that it does not have access privileges to the network, the machine type communication (MTC) device 104 will not attempt to attach to the network.

Figure 5:
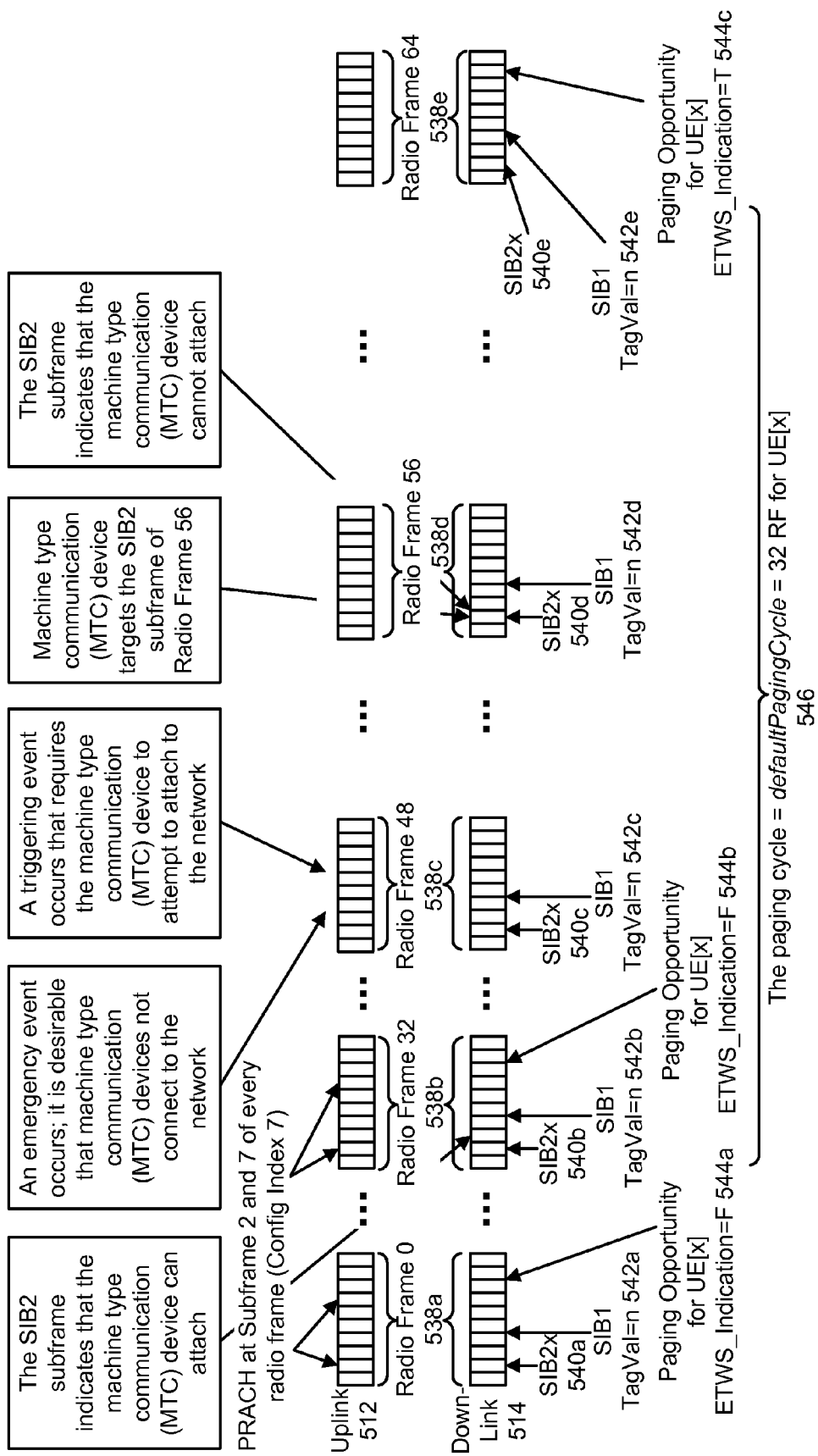
FIG. 5 also illustrates uplink and downlink radio frames between a base station and a machine type communication (MTC) device.

FIG. 5 also illustrates uplink 512 and downlink 514 radio frames 538*a-e* between a base station 102 and a machine type communication (MTC) device 104. As in FIG. 4, the paging cycle 546 may be 32 radio frames 538. Every eighth radio frame 538 may include an SIB2 subframe 540*a-e*. In the downlink 514 of radio frame 0 538*a*, the SIB2 subframe 540*a* may indicate that the machine type communication (MTC) device 104 can attach to the network. In the uplink 512 of each radio frame 583, the physical random access channel (PRACH) may be at subframe 2 and subframe 7. Every eighth downlink 514 radio frame 538 may also include an SIB1 subframe 542*a-e* with TagVal=n. The first radio frame 538 in a paging cycle 546 may include a paging opportunity 544*a-c*.

In Radio Frame 48 538*c*, an emergency event may occur. In one configuration, a triggering event for a machine type communication (MTC) device 104 may also occur during the same radio frame 538 as the emergency event. Rather than wait until the next modification period (i.e., Radio Frame 64 538*e*) to determine whether the machine type communication (MTC) device 104 has access privileges to the network, the machine type communication (MTC) device 104 may target the next available SIB2 subframe 540*d*, which is in Radio Frame 56 538*d* in this case. In one configuration, the SIB2 subframe 540 may be broadcast every eight radio frames 538, which will be every 80 ms. The machine type communication (MTC) device 104 may receive the SIB2 subframe 540*d* in the downlink 514 of Radio Frame 56 538*d*. The machine type communication (MTC) device 104 may then determine that it does not have access privileges to the network. The machine type communication (MTC) device 104 may abort the attempt to attach to the network without waiting until the next modification period (i.e., Radio Frame 64 538*e*).

Figure 6:
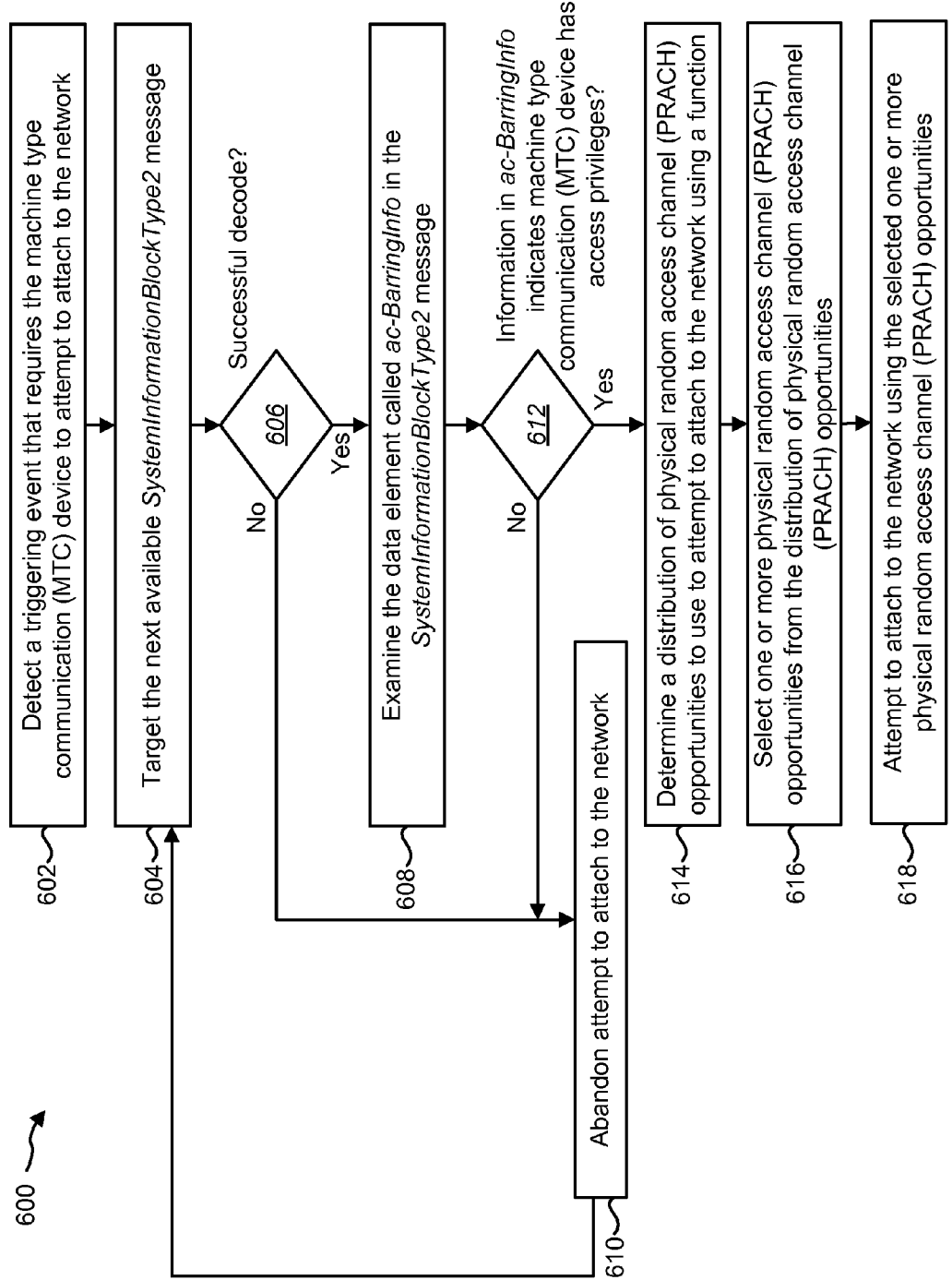
FIG. 6 is a flow diagram of another method for determining whether to attempt to access a network.

FIG. 6 is a flow diagram of another method 600 for determining whether to attempt to access a network. The method 600 may be performed by a machine type communication (MTC) device 104. The machine type communication (MTC) device 104 may detect 602 a triggering event that requires the machine type communication (MTC) device 104 to attempt to attach to the network. The machine type communication (MTC) device 104 may then target 604 the next available SystemInformationBlockType2 message (SIB2 subframe 540). Targeting 604 the next available SystemInformationBlockType2 message (SIB2 subframe 540) may include checking the status of ac-BarringInfo provided by the just received SIB2 subframe 540.

Normally a machine type communication (MTC) device 104 would wait until the next modification boundary before targeting the SystemInformationBlockType2 message because the base station 102 would be unable to update the SystemInformationBlockType2 data until the next modification period boundary (i.e., the base station 102 could only transition the data on a specific radio frame 538 at the modification boundary) but changes to the periodic update restrictions of the SIB2 ac-BarringInfo data allow updates to occur at any point in time.

The machine type communication (MTC) device 104 may determine 606 whether a successful decode of the SystemInformationBlockType2 message was obtained. If a successful decode was not obtained, the machine type communication (MTC) device 104 may abandon 610 the attempt to attach to the network. Instead, the machine type communication (MTC) device 104 may target 604 the next available SystemInformationBlockType2 message.

If a successful decode was obtained, the machine type communication (MTC) device 104 may examine 608 the data element called ac-BarringInfo in the SystemInformationBlockType2 message. The machine type communication (MTC) device 104 may determine 612 if the information in the data element ac-BarringInfo indicates that the machine type communication (MTC) device 104 has access privileges. If the machine type communication (MTC) device 104 does not have access privileges, the machine type communication (MTC) device 104 may abandon 610 the attempt to attach to the network and target 604 the next available SystemInformationBlockType2 message.

If the machine type communication (MTC) device 104 does have access privileges, the machine type communication (MTC) device 104 may use one or more physical random access channel (PRACH) opportunities to attempt to attach to the network. The physical random access channel (PRACH) resource that the machine type communication (MTC) device 104 will attempt to use may not be the physical random access channel (PRACH) opportunity immediately following the received SystemInformationBlockType2 message.

Instead, the machine type communication (MTC) device 104 may determine 614 a distribution of physical random access channel (PRACH) opportunities to use to attempt to attach to the network. The function may use one or more algorithms to determine 614 the distribution of physical random access channel (PRACH) opportunities. In a first algorithm, a simple random number generator along with a range value indicating the first and last physical random access channel (PRACH) opportunities may be used. In a second algorithm, the function may take as input a delta-time from when the machine type communication (MTC) device 104 first determined that it needed to attach to the network (i.e., when the triggering event occurs) and when the machine type communication (MTC) device 104 read the SystemInformationBlockType2 message (in the SIB2 subframe 540).

In a third algorithm, the function may take as input the machine type communication (MTC) device 104 registration number (i.e., IMEI, International Mobile Subscriber Identity (IMSI), Cell Radio Network Temporary Identifier (C-RNTI), Paging Radio Network Temporary Identifier (P-RNTI) or group association number), a range value indicating the first and last physical random access channel (PRACH) opportunity to use and a mapping of the registration value across the range. The function used by the machine type communication (MTC) device 104 to determine which physical random access channel (PRACH) opportunity to use after reading the SystemInformationBlockType2 message may be semi-statically configured by the network.

For example, the network may instruct the machine type communication (MTC) device 104 on which algorithm to use and the set of parameters to use. The base station 102 may know the algorithms that are in the machine type communication (MTC) device 104 for this purpose. The base station 102 may choose an algorithm (and perhaps a set of parameters). The base station 102 may control the algorithm used by the machine type communication (MTC) device 104 so that the base station 102 can better match the operation of the machine type communication (MTC) device to current network conditions.

The machine type communication (MTC) device 104 may select 616 one or more physical random access channel (PRACH) opportunities from the distribution of physical random access channel (PRACH) opportunities to use to attempt to attach to the network. The machine type communication (MTC) device 104 may then attempt 618 to attach to the network using the selected one or more physical random access channel (PRACH) opportunities.

Figure 7:
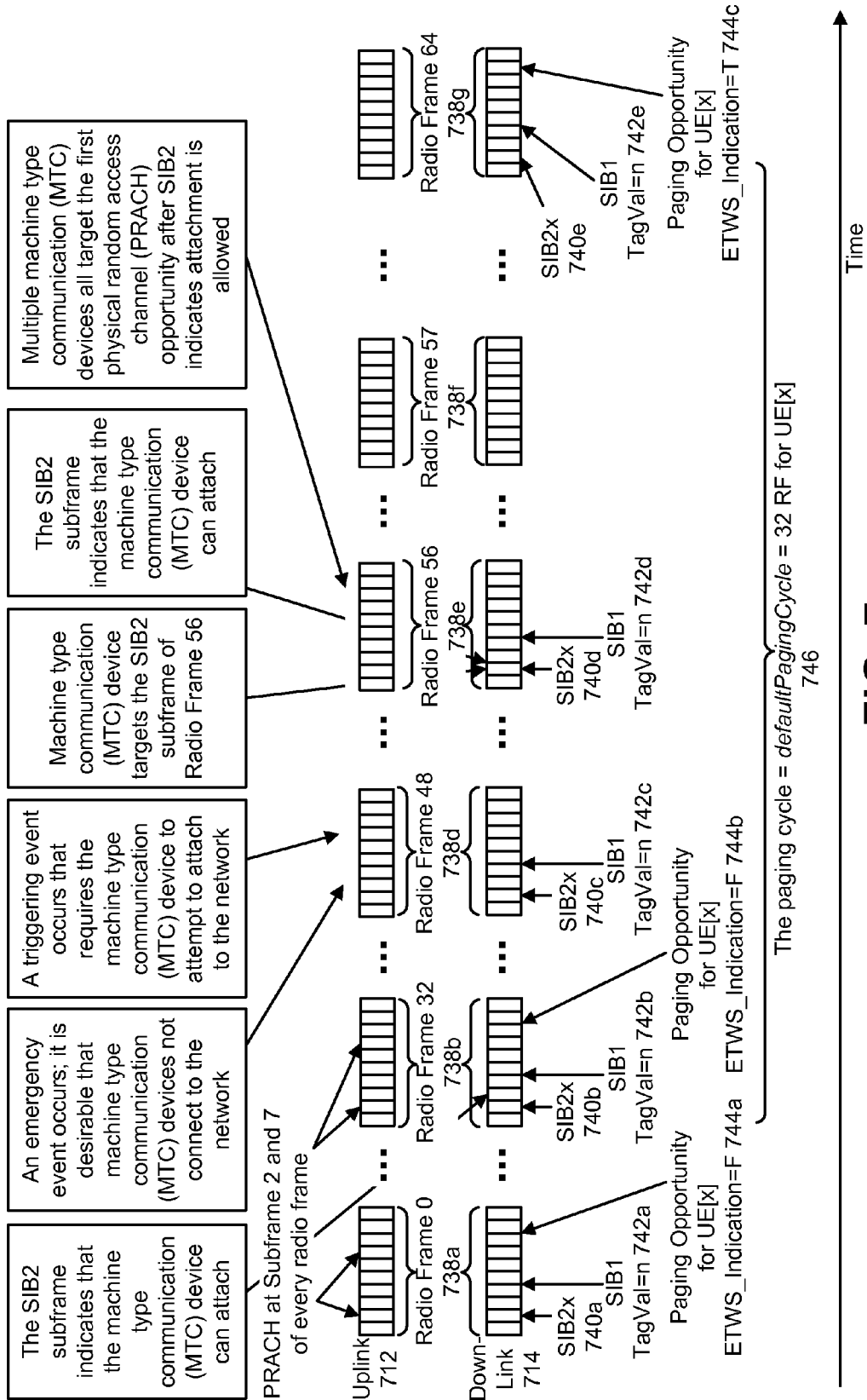
FIG. 7 illustrates uplink and downlink radio frames between a base station and a machine type communication (MTC) device with a machine type communication (MTC) device targeting the first physical random access channel (PRACH) opportunity.

FIG. 7 illustrates uplink 712 and downlink 714 radio frames 738a-g between a base station 102 and a machine type communication (MTC) device 104 with a machine type communication (MTC) device 104 targeting the first physical random access channel (PRACH) opportunity. Similar to FIG. 4 above, a paging cycle 746 may include 32 radio frames 738. In the downlink 714 of Radio Frame 0 738a, the SIB2 subframe 740a may indicate that the machine type communication (MTC) device 104 can attach to the network. The SIB1 subframe 742a-e may be broadcast every eighth radio frame 738 and may indicate the scheduling information 328 of the base station 102. In the uplink 712, the physical random access channel (PRACH) is at subframe 2 and 7 of every radio frame 738. Every other downlink 714 portion of a radio frame 738 may include an SIB1 subframe 742a-e. Every eight downlink 714 portion of a radio frame 738 may include an SIB2 subframe 740a-e. Every 32 radio frames (i.e., the first radio frame 738 in a paging cycle 746) may include a paging opportunity 744a-c.

In Radio Frame 48 738d, an emergency event may occur. It may be desirable to prevent the machine type communication (MTC) device 104 from connecting to the network for a period after the emergency event occurs. The network may choose to update the SIB2 information with a current access class 118 that restricts a machine type communication (MTC) device 104 from attaching to the network or the network may choose to not update the SIB2 information and continue to allow machine type communication (MTC) devices 104 to attach to the network.

A triggering event for the machine type communication (MTC) device 104 may also occur during the same paging cycle 746 as the emergency event. Although the triggering event is shown as occurring during Radio Frame 48 738d, a triggering event occurring during Radio Frame 32 738b through Radio Frame 63 would have similar results. The triggering event may require the machine type communication (MTC) device 104 to attempt to attach to the network.

The machine type communication (MTC) device 104 may target the next SIB2 subframe 740 to determine if the machine type communication (MTC) device 104 has access privileges to attach to the network. In one configuration, the information in the SIB2 subframe 740d of Radio Frame 56 738e may indicate that machine type communication (MTC) devices 104 can attach to the network. In this case, a machine type communication (MTC) device 104 may attempt to attach to the network.

In one configuration, multiple machine type communication (MTC) devices 104 may all respond to the same triggering event. Thus, multiple machine type communication (MTC) devices 104 may all target the first physical random access channel (PRACH) opportunity after the SIB2 subframe 740d indicating that the machine type communication (MTC) devices 104 have access privileges to attach to the network. If a significant number of machine type communication (MTC) devices 104 attempt to attach to the network at the same time, the machine type communication (MTC) devices 104 may overburden the physical random access channel (PRACH) resources of the base station 102.

Figure 8:
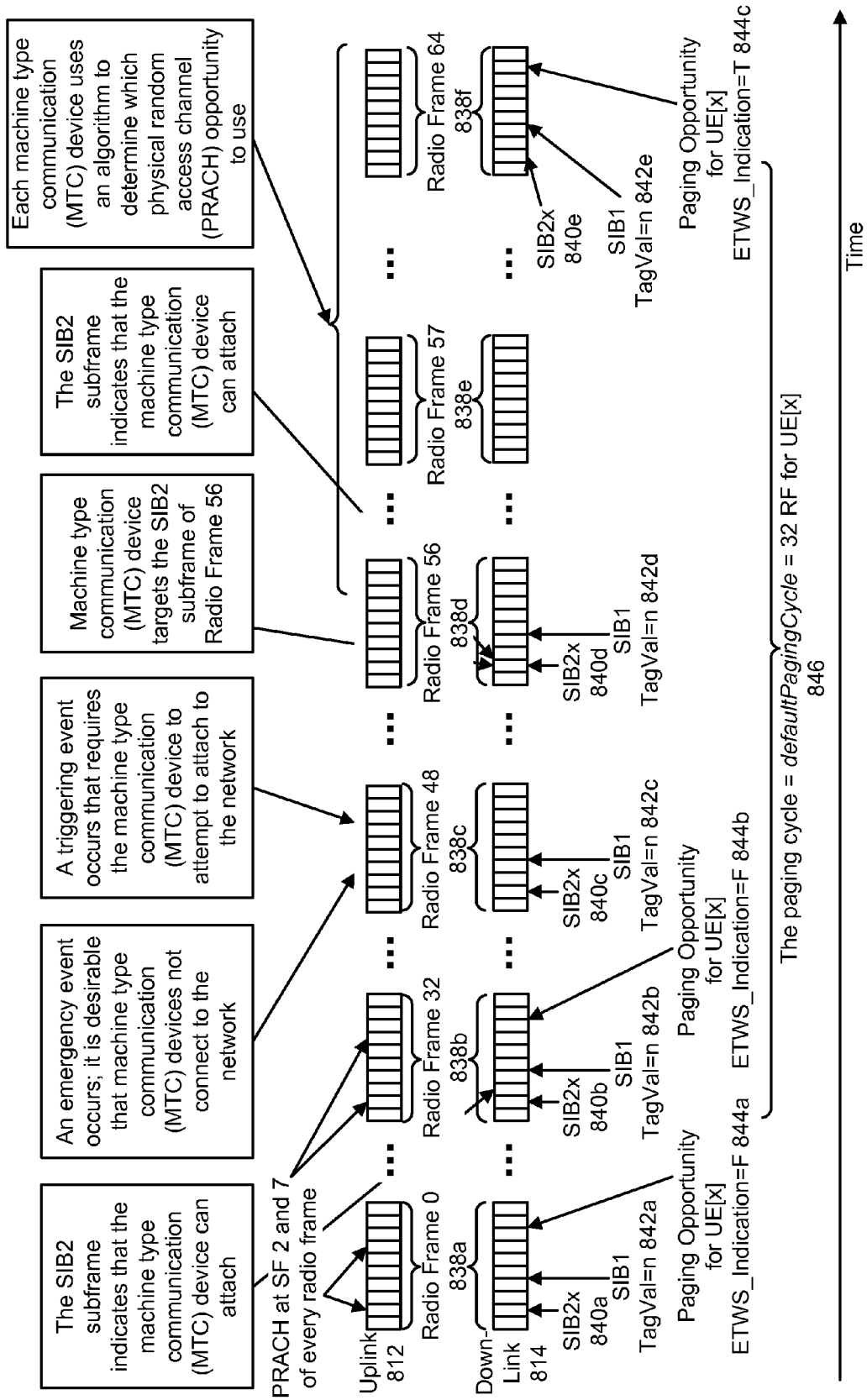
FIG. 8 illustrates uplink and downlink radio frames between a base station and a machine type communication (MTC) device with the machine type communication (MTC) device using an algorithm to determine which physical random access channel (PRACH) opportunity to use to attempt to attach to the network.

FIG. 8 illustrates uplink 812 and downlink 814 radio frames 838a-f between a base station 102 and a machine type communication (MTC) device 104 with the machine type communication (MTC) device 104 using an algorithm to determine which physical random access channel (PRACH) opportunity to use to attempt to attach to the network. Similar to FIG. 7 above, a paging cycle 846 may include 32 radio frames 838. Every eighth radio frame 838 may include an SIB2 subframe 840a-e and an SIB1 subframe 842a-e with a TagVal=n. The first radio frame 838 of each paging cycle 846 may also include a paging opportunity 844a-c.

In the downlink 814 of Radio Frame 0 838a, Radio Frame 32 838b and Radio Frame 64 838f, the SIB2 subframe 840 may indicate that the machine type communication (MTC) device has access privileges to the network. In the uplink 812, the physical random access channel (PRACH) is at subframe 2 and subframe 7 of every radio frame 838.

In Radio Frame 48 838c, an emergency event may occur. It may be desirable to prevent the machine type communication (MTC) device 104 from attaching/attempting to attach to the network for a period after the emergency event occurs. A triggering event may then occur that requires the machine type communication (MTC) device 104 to attach/attempt to attach to the network. The machine type communication (MTC) device 104 may target the next available SIB2 subframe 840 to determine if the machine type communication (MTC) device 104 can attach to the network. In one configuration, the machine type communication (MTC) device 104 may target the SIB2 subframe 840d in Radio Frame 56 838d.

The information in the SIB2 subframe 840d may indicate that the machine type communication (MTC) device 104 has access privileges to attempt to attach to the network. The machine type communication (MTC) device 104 may then use an algorithm to determine which physical random access channel (PRACH) opportunity or opportunities to use to attempt to attach to the network. Some of the possible algorithms for determining which physical random access channel (PRACH) opportunity to use were discussed above in relation to FIG. 6. If multiple machine type communication (MTC) devices 104 respond to the same triggering event, the use of an algorithm by each machine type communication (MTC) device 104 to determine which physical random access channel (PRACH) opportunity to use to attempt to attach to the network may reduce the possibility of overburdening the physical random access channel (PRACH) resources of the base station 102.

Figure 9:
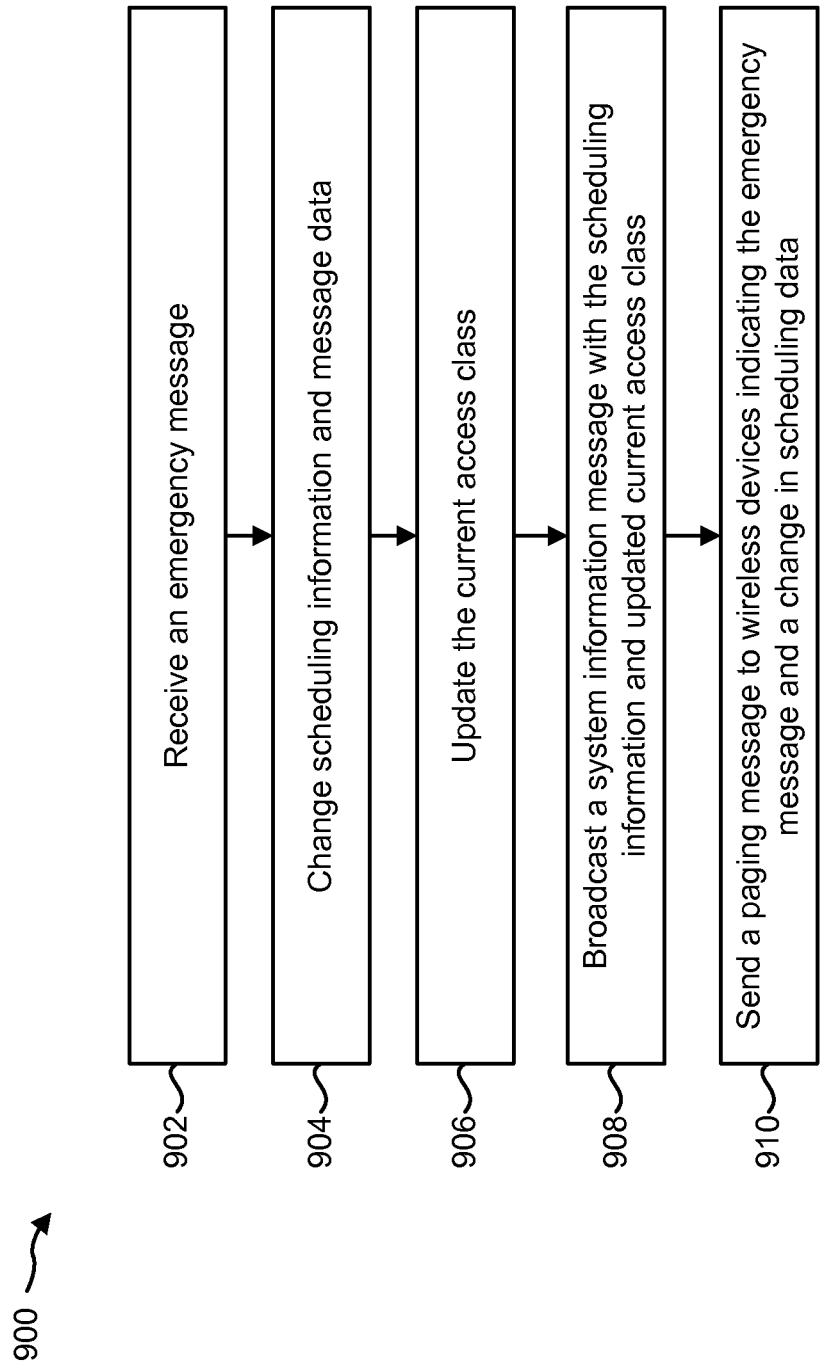
FIG. 9 is a flow diagram of a method for handling emergency events.

FIG. 9 is a flow diagram of a method 900 for handling emergency events. The method 900 may be performed by a base station 102. In one configuration, the base station 102 may be an evolved NodeB. The base station 102 may receive 902 an emergency message. The emergency message may be received from a core network 110. The emergency message may be an Earthquake and Tsunami Warning System (ETWS) message or a Commercial Mobile Alert System (CMAS) message.

The base station 102 may change 904 scheduling information 328 and message data (i.e., emergency information 330). The scheduling information 328 and message data may be part of System Information (SI) messages 324 broadcast to wireless communication devices 106 and machine type communication (MTC) devices 104 to help establish a communication link with the network. As discussed above in relation to FIG. 3, the scheduling information 328 may be included in a SystemInformationBlockType1 (SIB1 subframe 442) and may include an indication of where emergency messages 330 are located and an indicator 334 that a change in the System Information (SI) message 324 has occurred. The message data may be included in a SystemInformationBlockType10/11/12 (SIB10/11/12 subframe) and may include emergency message data such as Earthquake and Tsunami Warning System (ETWS) message data and Commercial Mobile Alert System (CMAS) message data.

The base station 102 may also update 906 the current access class 118. The current access class 118 may be included in ac-BarringInfo of a SystemInformationBlockType2 (SIB2 subframe 440). The base station 102 may broadcast 908 a system information message 324 with the scheduling information 328 and the updated current access class 118. The scheduling information 328 may be included in an SIB1 subframe 442. The updated current access class 118 may be included in an SIB2 subframe 440. The base station 102 may also send 910 a paging message 332 to wireless devices 322 with an emergency indicator 336 and a system information change indicator 334.

Figure 10:
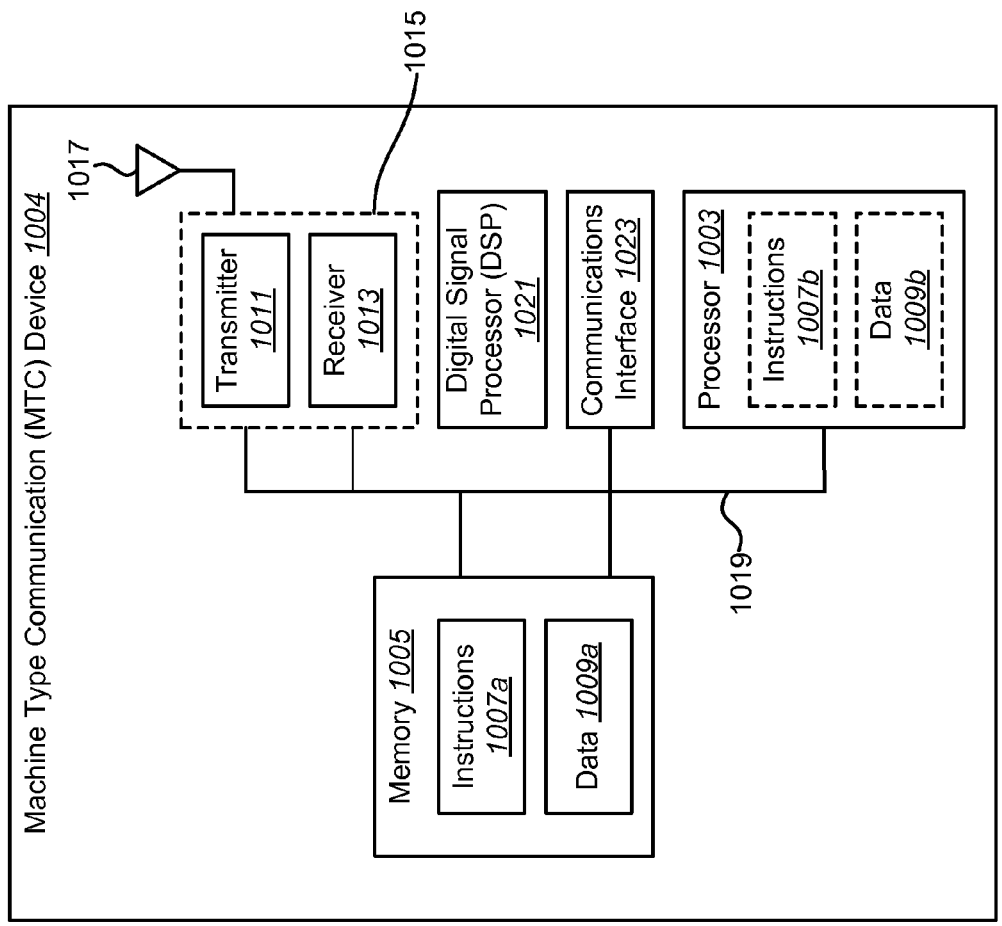
FIG. 10 illustrates various components that may be utilized in a machine type communication (MTC) device.

FIG. 10 illustrates various components that may be utilized in a machine type communication (MTC) device 1004. The machine type communication (MTC) device 1004 may be a remote meter reader, a disease management device, a navigation system, a surveillance system, etc. The machine type communication (MTC) device 1004 includes a processor 1003 that controls operation of the machine type communication (MTC) device 1004. The processor 1003 may also be referred to as a CPU. Memory 1005, which may include both read-only memory (ROM), random access memory (RAM) or any type of device that may store information, provides instructions 1007a and data 1009a to the processor 1003. A portion of the memory 1005 may also include non-volatile random access memory (NVRAM). Instructions 1007b and data 1009b may also reside in the processor 1003. Instructions 1007b loaded into the processor 1003 may also include instructions 1007a from memory 1005 that were loaded for execution by the processor 1003. The instructions 1007b may be executed by the processor 1003 to implement the methods disclosed herein.

The machine type communication (MTC) device 1004 may also include a housing that includes a transmitter 1011 and a receiver 1013 to allow transmission and reception of data. The transmitter 1011 and receiver 1013 may be combined into a transceiver 1015. An antenna 1017 is attached to the housing and electrically coupled to the transceiver 1015. Additional antennas may also be used.

The various components of the machine type communication (MTC) device 1004 are coupled together by a bus system 1019 which may include a power bus, a control signal bus, and a status signal bus, in addition to a data bus. However, for the sake of clarity, the various buses are illustrated in FIG. 10 as the bus system 1019. The machine type communication (MTC) device 1004 may also include a digital signal processor (DSP) 1021 for use in processing signals. The machine type communication (MTC) device 1004 may also include a communications interface 1023 that provides user access to the functions of the machine type communication (MTC) device 1004. The machine type communication (MTC) device 1004 illustrated in FIG. 10 is a functional block diagram rather than a listing of specific components.

Figure 11:
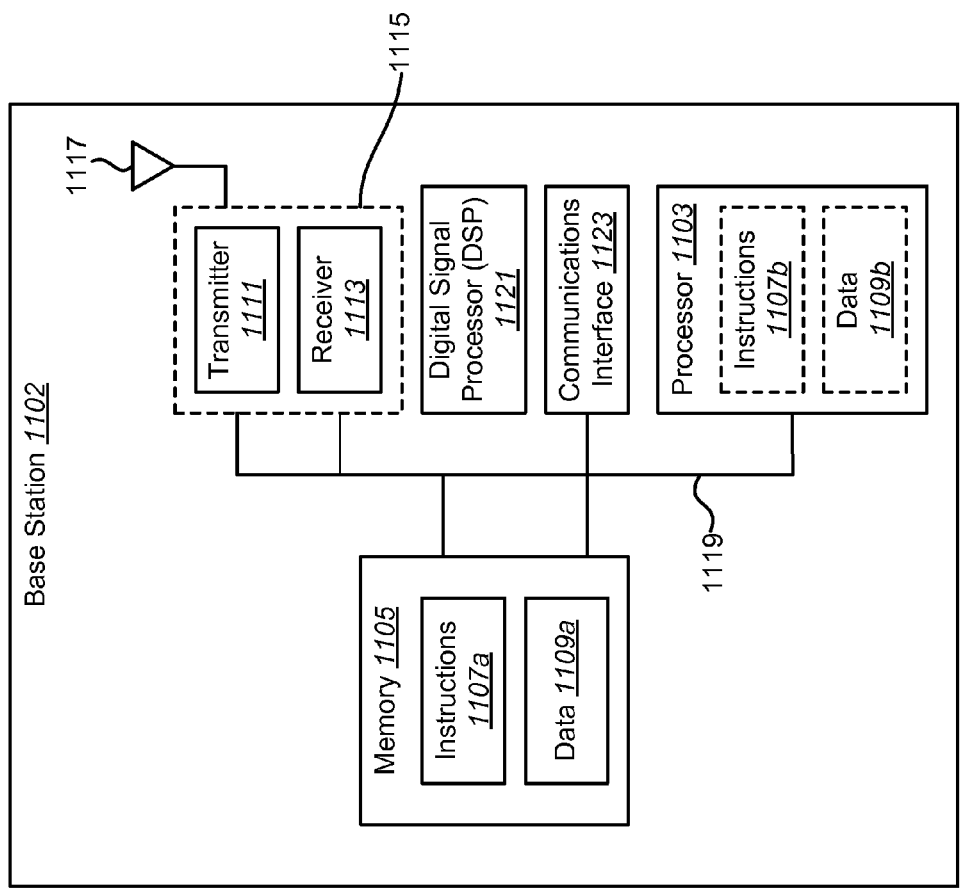
FIG. 11 illustrates various components that may be utilized in a base station.

FIG. 11 illustrates various components that may be utilized in a base station 1102. The base station 1102 may include components that are similar to the components discussed above in relation to the machine type communication (MTC) device 1004, including a processor 1103, memory 1105 that provides instructions 1107a and data 1109a to the processor 1103, instructions 1107b and data 1109b that may reside in the processor 1103, a housing that contains a transmitter 1111 and a receiver 1113 (which may be combined into a transceiver 1115), an antenna 1117 electrically coupled to the transceiver 1115, a bus system 1119, a digital signal processor (DSP) 1121 for use in processing signals, a communications interface 1123, and so forth.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method performed by a machine type communication device, the method comprising:
    receiving first access barring information and second access barring information from a base station; and
    determining, based on the first access barring information and the second access barring information, whether or not the machine type communication device abandons attempting to connect to a network, wherein
    the second access barring information is transmitted a plurality of times within a present modification period which is bounded by a subsequent modification period, and all transmissions of the second access barring information within the present modification period includes the same content, and boundaries of the present modification period are defined based on a system frame number; and
    the first access barring information is updatable at any point within any modification periods.

2. The method of claim 1, further comprising:
    receiving a paging message to provide notice of a change to a system information.

3. A method performed by a base station, the method comprising:
    transmitting first access barring information and second access barring information, wherein
    the second access barring information is transmitted a plurality of times within a present modification period which is bounded by a subsequent modification period, all transmissions of the second access barring information within the present modification period include the same content, and boundaries of the present modification period are defined based on a system frame number;
    the first access barring information is updatable at any point within any modification periods; and
    the first access barring information and the second access barring information indicate whether or not a machine type communication device abandons attempting to connect to a network.

4. The method of claim 3, further comprising:
    transmitting a paging message to provide notice of a change to a system information.

5. A machine type communication device comprising:
a processor; wherein
the processor is configured and/or programmed to:
receive first access barring information and second access barring information from a base station; and
determine, based on the first access barring information and the second access barring information, whether or not the machine type communication device abandons attempting to connect to a network, wherein
the second access barring information is transmitted a plurality of times within a present modification period which is bounded by a subsequent modification period, all transmissions of the second access barring information within the present modification period includes the same content, and boundaries of the present modification period are defined based on a system frame number; and
the first access barring information is updatable at any point within any modification periods.

6. The machine type communication device of claim 5, wherein the processor is further configured and/or programmed to receive a paging message to provide notice of a change to a system information.

7. A base station, comprising:
a processor; wherein
the processor is configured and/or programmed to:
transmit first access barring information and second access barring information, wherein
the second access barring information is transmitted a plurality of times within a present modification period which is bounded by a subsequent modification period, all transmissions of the second access barring information within the present modification period includes the same content, and boundaries of the present modification period are defined based on a system frame number;
the first access barring information is updatable at any point within any modification periods; and
the first access barring information and the second access barring information indicate whether or not a machine type communication device abandons attempting to connect to a network.

8. The base station of claim 7, wherein the processor is further configured and/or programmed to transmit a paging message to provide notice of a change to a system information.

* * * * *